(12) United States Patent
Boyden (10) Patent No.: US 6,430,394 B1
(45) Date of Patent: Aug. 6, 2002

(54) SYSTEM FOR CONTROLLING COMMUNICATIONS BETWEEN A TERMINAL AND SATELLITE AND METHOD THEREFORE

(75) Inventor: Albert K. Boyden, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/336,378

(22) Filed: Jun. 17, 1999

(51) Int. Cl.[7] ............................................... H04B 7/185
(52) U.S. Cl. .................... 455/13.4; 455/13.1; 455/12.1; 370/316
(58) Field of Search ................................ 455/522, 13.4, 455/12.1, 13.1, 427, 63, 67.3; 370/318, 316

(56) References Cited

U.S. PATENT DOCUMENTS

| | | | |
|---|---|---|---|
| 4,047,151 A | 9/1977 | Rydbeck | 340/146 |
| 4,261,054 A | 4/1981 | Scharla-Nielsen | 455/12 |
| 4,309,764 A | 1/1982 | Acampora | 370/83 |
| 4,653,114 A * | 3/1987 | Berman | 455/5 |
| 5,335,249 A | 8/1994 | Kruger et al. | 375/1 |
| 5,430,760 A * | 7/1995 | Dent | 375/200 |
| 5,511,079 A | 4/1996 | Dillon | 371/43 |
| 5,699,365 A | 12/1997 | Klayman et al. | 371/5.5 |
| 5,721,742 A | 2/1998 | Okajima et al. | 371/35 |
| 5,768,684 A | 6/1998 | Grubb et al. | 455/13.4 |
| 6,067,458 A * | 5/2000 | Chen | 455/522 |
| 6,157,616 A * | 12/2000 | Whitehead | 370/252 |
| 6,219,528 B1 * | 4/2001 | Wright et al. | 455/13.4 |
| 6,240,124 B1 * | 5/2001 | Wiedeman et al. | 375/130 |

* cited by examiner

Primary Examiner—William Trost
Assistant Examiner—S. Smith
(74) Attorney, Agent, or Firm—Louis L. Dachs (57) ABSTRACT

A system for determining uplink transmission quality of timing probe signals sent from a terminal to a satellite the satellite having a system to provide an indicator signal to the terminal as to whether a timing probe signal sent from the terminal has been received thereby. Timing probe signals are sent to the satellite, which determines if they are received. If not received, the satellite informs the terminal. The terminal thereafter increases transmission power until the satellite informs the terminal of receipt. The terminal thereafter adjusts the transmission power downward until the satellite no longer detects the signal. The process is repeated so that terminal power transmission is kept at a minimum.

11 Claims, 7 Drawing Sheets

SYSTEM FOR CONTROLLING COMMUNICATIONS BETWEEN A TERMINAL AND SATELLITE AND METHOD THEREFORE

BACKGROUND OF THE INVENTION

1. Field of the Invention

The invention relates to the field of satellite communication systems, and, in particular, to systems and methods of controlling the bit error rate of transmissions from a terminal to a satellite in order to compensate for rain fade and the like.

2. Description of Related Art

Typical satellite communications systems used to connect remote terminals to other such terminals such as cellular phone systems, or to connect broadcast control center to individual terminals such as used in TV satellite broadcasting, or to control earth observation satellites, all require means to compensate for radio link rain fade and the like. There have been numerous systems for compensating for changes in transmission conditions between a remote terminal and the satellite. An early example can be found in NASA's ACTS System. In the ACTS System rain fade is estimated at the ground station by monitoring three separate beacons on board the satellite and forward error correction (FEC) rate is adjusted accordingly. However, such a system is only suitable for experimental satellite communication systems, for it takes up to much of the satellites available assets and is not adapted for use with remote terminals. U.S. Pat. No. 5,511,079 "Apparatus And Method For Controlling Forward Error Correction Encoding In A very Small Aperture Terminal" by D Dillon a system and process that controls the FEC of a VSAT earth station in order to compensate for signal loss between the VAST and hub station due to rain fade and the like. In detail, the hub earth station is adapted to measure the echo signal produced by the satellite's transponder in response to a transmission therefrom. The hub station is further capable of generating a signal that is transmitted to the VSAT earth stations that is indicative of the propagation conditions at the hub. The VSAT earth station is capable of receiving this signal and in response thereto determines the proper FEC in accordance with the propagation conditions both locally at the VSAT and remotely at the hub. In other words, the VSAT slows or speeds up the data transmission rate depending upon propagation conditions. However, such a system is designed for use with a VSAT that does not have means to measure the quality of a received or transmitted signal. Furthermore, it is not usable where the satellite incorporates on board processing and the uplink and downlink signals are decoupled.

U.S. Pat. No. 5,721,742 "Terminal, Network, And Communication System" by I, Okajima, et al. discloses a communication system where the data for transmission is FEC encoded based on the type of message and not on the propagation conditions at any point along the link. The decision to apply an FEC is made solely in the VSAT based on a predetermined message type (length) criteria. Information is included in the sent message to allow the receiving terminal to correctly decode the message. Here no attempt is made to compensate for atmospheric conditions, such as rain fade.

U.S. Pat. No. 4,047,151 "Satellite Communications System And Apparatus" by P. Baran relates to communication systems where the data for transmission is encoded in a spread spectrum scheme that allows gradual consumption of resources in response to propagation conditions. However, no mechanism for obtaining propagation conditions is provided.

U.S. Pat. No. 4,261,054 "Real-time Adaptive Power Control In Satellite Communications Systems" by H. Scharia-Nielsen discloses a transponded communication systems wherein means are provided to adjust the sending VSATs uplink power based on another VSAT's reported received detected decode errors. This adaptive power control (not adaptive FEC) is based on the summation of the propagation conditions between the sender and the monitoring VSAT (one or both of which may be in rain) and may not be representative of the sender-to-receiver VSAT path. It does not allow the VSAT to be its own link quality monitor and allowing power and/or FEC adaptation based solely on its VSAT-to-satellite propagation conditions.

U.S. Pat. No. 5,335,249 "Method And Apparatus For Spread Spectrum Communications" by T. E. Krueger, et al. discloses a communications system that includes means to select between using narrow band or spread spectrum for a link between a sender and receiver, and to optimize the spread spectrum parameters to meet the link reliability required. The method establishes a link and selects the "best" parameters. When the link degrades below the reliability threshold the process is reset to begin again. However, this invention does not use a dynamic adaptive coding/power process in response to changing link propagation conditions.

U.S. Pat. No. 5,603,096 "Reverse Link, Closed Loop Power Control In A code Division Multiple Access System" by K. S. Gilhousen, et al. discloses a communications systems where the receiver measures the sender's power and compares it to a stored expected value. The receiver then instructs the sender to increase/decrease its transmitter level to stay within a given received power level window. This invention does use received power measurements but does not provide for the sender to determine its own power needed in response to local link propagation conditions.

U.S. Pat. No. 4,309,764 "Technique For Increasing the Rain Margin Of A Satellite Communication System" by A. Acampora applies to transponded communications systems where a VSAT uses an unspecified mechanism to adjust its uplink power to overcome rain fades and notifies the Hub to notify the sender to use additional return path resources to overcome a downlink fade. The Hub controls the assignment of resources. In this system use of additional assets to counter rain fades is applied to both VSAT-to-satellite links, even if only one link is experiencing a rain fade.

U.S. Pat. No. 5,768,684 "Method And Apparatus For Bi-Directional Power Control in A Digital Communication System" by J. E. Grubb, et al. discloses a processing satellite system where the receiving nodes (including the satellite) measure the received power level from a sender using an estimated bit error rate. This received power level is then sent back to the sender such that the sender can adjust its transmitting power level to match the link propagation conditions. The sender does not perform its own uplink and downlink power level measurements and does not include adaptive coding to increase the overall link margin dynamic range.

U.S. Pat. No. 5,699,365 "Apparatus And Method For Adaptive Forward Error Correction In Data Communications" by J. T. Klayman, et al. discloses a communications system where the receiver monitors the FEC error results from messages sent to it. When the errors reach a threshold, the receiver informs the sender to use a more/less robust FEC. However, the same FEC is employed from the sender to the receiver, and this wastes band width on portions of the link not needing a robust FEC.

Therefore, what is needed is an active closed loop adaptive coding system between the satellite and the VSAT without using any Hub or network control center (NCC) measurement data in the process. Furthermore, it is also important to permit the adjusting of both the VSAT's uplink and downlink FEC rates and uplink power to meet propagation conditions local to the VSAT-to-satellite link only, thus allowing higher throughput in both directions without using increased satellite resources. The NCC's local propagation conditions should remain immaterial and only independently operated on its own Hub-to-satellite link.

Thus, it is a primary object of the invention and method of providing a terminal to satellite communication system that can compensate for changes in propagation conditions therebetween.

It is another primary object of the invention to provide a system and method of providing an adaptive coding system for insuring error free communications between a satellite and remote terminal when propagation conditions therebetween deteriorate.

It is a further object of the invention to provide and method of providing an adaptive coding system for insuring error free communications when between a satellite and remote terminal that only requires the determination of local propagation conditions.

Finally it is an objective of the invention to not increase satellite complexity by requiring satellite measurements of the VSAT-to-satellite link parameters.

SUMMARY OF THE INVENTION

The invention is a method and system for determining the uplink transmission quality of a signal sent from a terminal to a satellite, which may vary due to changes in atmospheric conditions. In detail, the method includes the steps of periodically preparing a self-addressed data packet for sending to the satellite for transmission to the satellite. These self-addressed data packets are sent to the satellite dispersed within the normal data packets. However, this particular data packet is transmitted to the satellite at an incrementally reduced power setting. The satellite thereafter retransmits the data packet back to the terminal. The transmission quality of the retransmitted self-addressed data packet is measured and compared to a reference transmission quality level. The difference, if any, is used to generate an error signal indicative of the required change in transmission quality level of the terminal uplink signal required to maintain the uplink signal at a specific level.

If the transmission quality level is unacceptable, a determination is made as to whether the terminal can increase the power of its transmissions. If it can, the power level of the terminal is incrementally increased. This procedure is repeated until the transmission power level of the self-addressed data packets is within acceptable level power. Thereafter, the transmission power level of all data packet transmissions is raised to this level. However, if the transmission quality level of these self-addressed data packets is above an acceptable, then the power level is reduced in incremental steps, until the quality level is at a just acceptable level. Thereafter, the transmission level of the all the data packets is reduced to this level. It should be noted that such power levels occur over a relatively long time as defined by local rain fade rate. The frequency of power adjustments is based on the rate of change in propagation conditions.

However, there is a point where the transmissions between the terminal and satellite have been so degraded that the power level of the terminal can no longer be increased. At this point in time, the terminal automatically requests the network control center to switch the satellite to receive uplink signals transmitted by the terminal from light encoding rates to heavy encoding rates. The satellite then switches so that it can receive and process heavy encoding rates rather than light encoding rates. Thereafter, the terminal transmits data packets at these heavy encoding rates. Of course, the power transmission adjustment procedure continues. If, on the other hand, the terminal has been transmitting at heavy encoding rates, and transmissions conditions improve to a point that the power level can not be further reduced, the opposite occurs. The terminal requests the NCC to change from heavy encoding rates to light encoding rates.

The above method requires that the terminal be transmitting in order to make a determination of the required terminal transmission power level and/or encoding rate. However, it is possible to determine the required power level and encoding rate, by use of terminal uplink time synchronization probes. A part of each data channel contains a time probe signal slot that is used to insure that the terminal is in synchronization with the satellite in a system using Time Domain Multiple Access (TDMA) Mode. Here specific timing probe signal are periodically prepared and transmitted to the satellite at a specific power level. The satellite uses these signals to determine if the terminal is time synchronized with the satellite and will inform the terminal if the signal is early or late. It will also inform the terminal whether is has received the timing probe. If the terminal is informed that it has not received the signal, it incrementally increases the power output of the terminal when transmitting the specific timing probe signal if the previously sent specific timing probe was not received. This procedure is repeated until the satellite detects the probe and reports that the timing probe signal has been received. At this point in time, the power level all the data packets is raised to this level. The data packet uplink power setting is coorellatable to the timing probe uplink power. Then the power level of the terminal used to transmit these specific timing probes is decreased until the satellite reports that it no longer is receiving these specific timing probes. Thereafter, the power level is raised back up towards the previous level where the satellite had reported receipt of the specific timing probe signal and all data transmissions from the terminal are made at this power level. This process is repeated with hysteresis allowing the terminal to track a varying satellite receive threshold.

However, as previously mentioned, there is a point where the transmissions between the terminal and satellite have been so degraded that the power level of the terminal can no longer be increased. At this point in time, the terminal automatically requests the network control center to switch the satellite to receive uplink signals transmitted by the terminal from light encoding rates to heavy encoding rates. The satellite then switches so that it can receive and process heaving encoding rates rather than light encoding rates. Thereafter, the terminal transmits data packets at these heavy encoding rates and timing probes using a correspondingly longer code. Of course, the power transmission adjustment procedure continues. If, on the other hand, the terminal has been transmitting at heavy encoding rates, and transmissions conditions improve to a point that the power level can not be further reduced, the opposite occurs. The terminal requests the NCC to change from heavy encoding rates to light encoding rates.

The use of timing probes has the advantage of being able to determine the proper power level even when data is not being transmitted by the terminal. As long as the terminal is on, timing probe signals are generated in order to maintain the terminal properly synchronized with the satellite the terminal then knows the correct data packet uplink power. The method can be used as a separate method of insuring minimum use of terminal power, or in conjunction with the use of self-addressed data packets.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
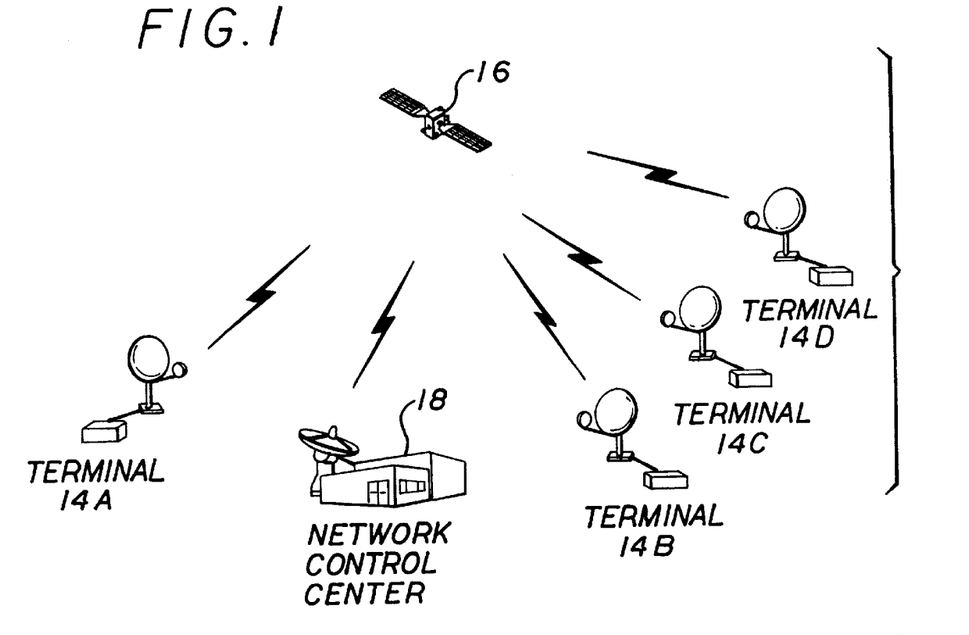
FIG. 1 is a perspective view of a satellite communication system wherein a series of remote terminals are interconnected by a satellite under the control of a network controller.
Figure 2:
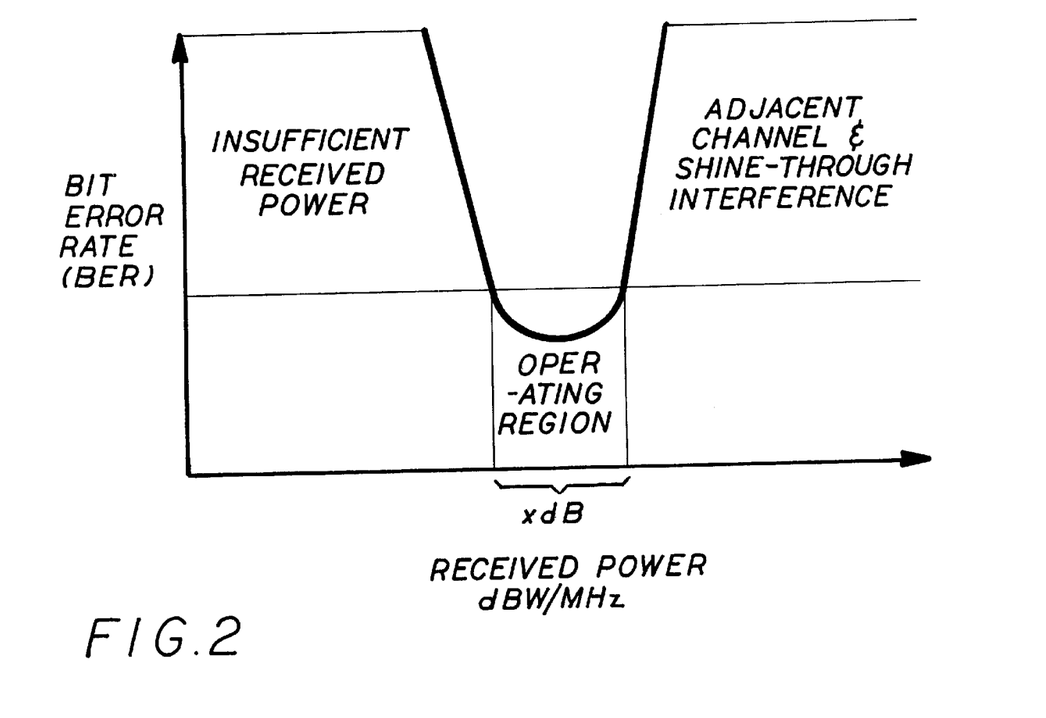
FIG. 2 is a graph plotting bit error rate against received power indicating the acceptable power band necessary to obtain minimum bit-error-rate.

As illustrated in FIG. 1, remote terminal indicated by numeral 14A is used to transmit signals via satellite 16 to one or more other remote terminals 14B, C, and D. The satellite is under the control of a network control center (NCC) 18. Typically, there are thousands of remote terminals and only a few are shown for purposes of illustration. The satellite is designed to process the uplink signals from the various terminals and conducts onboard signal processing prior to retransmission to other terminals. The onboard processing permits routing of the terminal data traffic between terminals and allows for congestion control based on the system loading. The NCC allocates system resources (frequencies, bandwidth and associated traffic data rates and encoding schemes). Terminals transmit within a NCC assigned uplink frequency channel and time slot. Each uplink channel has an associated encoding scheme. The NCC pre-configures each satellite uplink channel to use a particular encoding scheme. All terminals within a coverage area receive all data transmitted by the satellite and hence, can decode all satellite encoded traffic. Referring to FIG. 2, the power setting of the terminal 14A is set to a nominal value that insures a signal at an acceptable bit error rate (BER) reaching the satellite. Too high a received power level and the energy bleeds into an adjacent channel (due to imperfect bandpass shaping) or bleeds into another beam operating at the same frequency (due to frequency reuse and imperfect antenna patterns). Both of these cause interference that increases that other channels BER. Too little received power results in an increase in BER beyond an acceptable level on the intended channel. It is the purpose of this invention to provide a system for insuring that bit error of the transmitted signal always remains within the operating region.

Figure 3:
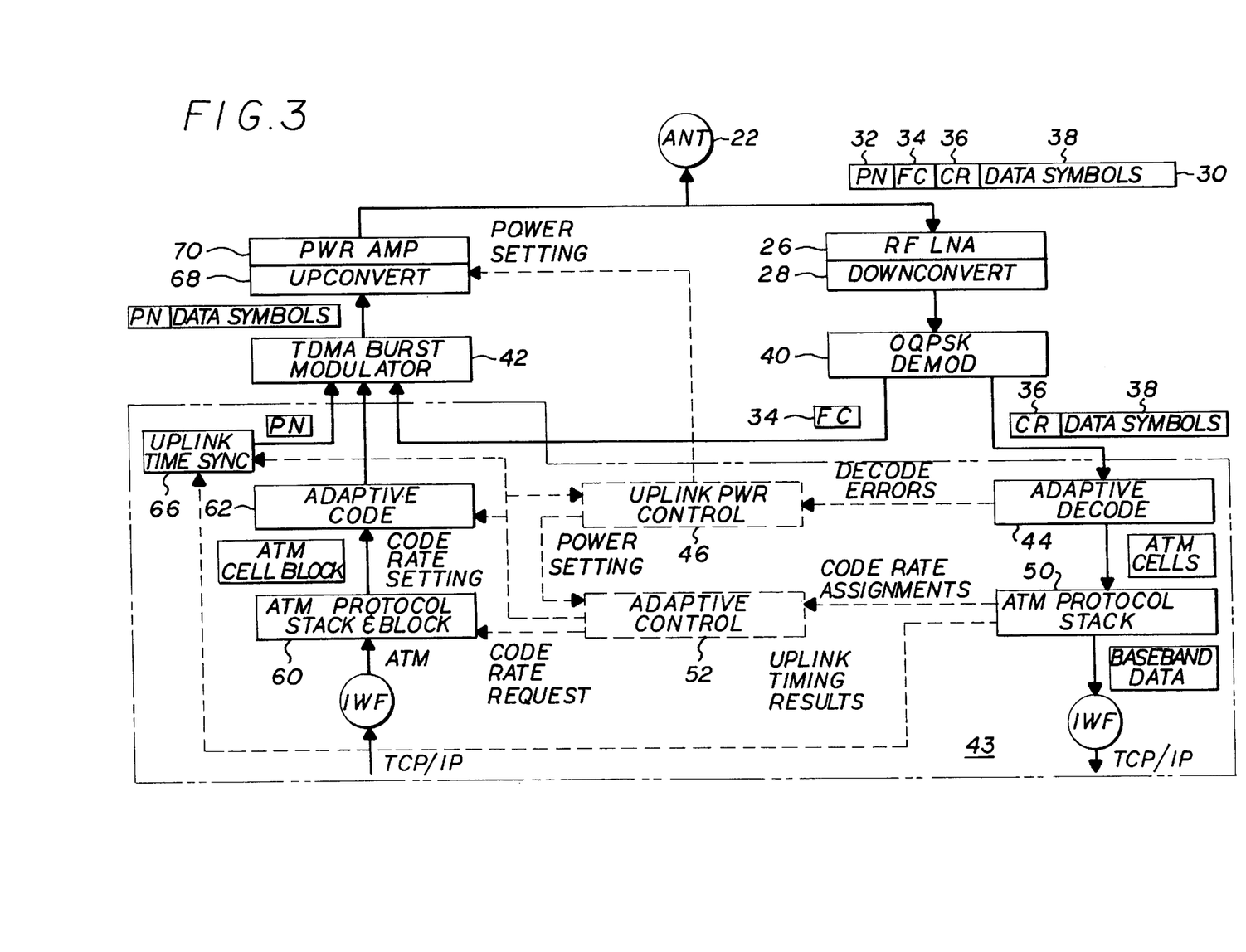
FIG. 3 is a generalized schematic of the terminal.

In order to understand the invention it is first necessary to explain how the terminal uplink and downlink systems function. Referring to FIGS. 1 and 3 the terminal 14A receives the satellite 16 downlink signal from an antenna 22, which is initially passed to a low noise amplifier (LNA) 26 that amplifies the downlink signal and sends it to a converter 28. The converter 28 takes the RF signal from Ka Band down to an IF frequency. The typical data symbol block 30 typically consists of a phasing sequence indication 32, a frame count indication 34, a code rate header 36, and a block of encoded data symbols 38. A OQPSK demodulator 40 synchronizes on the phasing sequence indication 32 of the downlink data symbol block and demodulates it. The downlink frame count 34 is forwarded to the uplink Time Division Multiple Access (TDMA) burst modulator 42, the function of which will be subsequently explained. The data output from the demodulator 40 consists of code rate header 36 header followed by a block of data symbols 38 that is sent to baseband system 43 and in particular to the adaptive decoder 44 therein.

The adaptive decoder 44 demodulates and decodes all data symbol blocks in the downlink based on the code rate header. Symbol blocks are received that are either heavily or lightly encoded using a more or less robust outer code respectively plus a common inner code. The adaptive decoder 44 examines the code rate header 36 and routes the symbol block 38 and determines if light FEC decoding or heavy FEC decoding is required. The lightly encoded blocks are decoded of their outer FEC code and the resulting symbols are forwarded on for inner FEC decoding. The decoding error results are forwarded to the uplink power controller 46. The heavy encoded blocks are decoded of their outer FEC code and the resulting symbols are forwarded on for inner FEC decoding. The decoding error results are also forwarded to the uplink power controller 46.

The symbol blocks are further decoded of their inner FEC code, which results in a sequential string of asynchronous transfer mode (ATM) cells (several ATM cells are normally included in a data packet). The inner and outer decoding error results (BER) are forwarded to the uplink power controller 46. The ATM protocol stack program 50 examines the ATM cell header addressing and discards cells not destined to this terminal. The ATM protocol stack program 50 operates on the various signaling, control and traffic cells and, germane here, extracts control information for uplink channel and code rate assignment responses from the NCC 18 and, probe results from uplink timing synchronization. Traffic cells are passed on to the Inter-Working Function (IWF) which performs protocol conversion from ATM to Internet Protocol (IP) for the terminal user. Coding rate assignments are forwarded to an adaptive controller 52. The function of the uplink power controller 46 and adaptive controller 52 will be subsequently discussed. Thus the terminal 14A can receive data from the satellite 16.

User IP data enters the IWF for conversion to the ATM protocol. This baseband data is then converted into ATM cells by the ATM protocol stack program 60 and packaged into blocks of cells of sufficient length for the FEC coding to have sufficient gain. The ATM protocol stack program 60 also processes control and signaling messages. ATM cell blocks are then encoded by the adaptive coder 62 into light inner FEC code. If the terminal is operating in a light channel, then the encoded symbol block is forwarded to the modulator 42. If the terminal is operating in a heavy channel, then the light encoded symbol block is encoded again by a heavy outer encoding before being forwarded to the modulator 42. The adaptive coder accepts an input from the adaptive controller 52 to control application of either a heavy or light encoding. The TDMA burst modulator 42 receives the encoded symbol blocks and modulates them into the terminals assigned time and frequency slot. The uplink time synchronizer 66 controls the frequency of the modulator 42 through a closed loop process of uplinking timing probes. Timing probes consist of a Pseudo-random Noise (PN) sequence used by the satellite to determine time of arrival The terminal receives back from the satellite a report of whether their reception was early or late in relation to the satellite clock. The TDMA burst modulator 42 therefore receives the periodic uplink probes from the uplink time synchronizer 61 and modulates these into the assigned probing time and frequency slot. As previously stated frame count is received from the downlink demodulator 40 and is used to delineate uplink frame boundaries needed to locate assigned uplink time slots. The uplink converter 68 raises the frequency of the modulators IF output to Ka Band and amplifies the signal for uplinking and the power amplifier 70 transmits the signal. Thus the terminal 14A can transmit data to the satellite 16.

However, as previously discussed it necessary to control bit error rate to acceptable levels while transmitting at a minimum power level. This is accomplished in the following manner. The uplink power control 46 receives BER information form the adaptive decoder 44 and changes uplink power up or down accordingly. Uplink path attenuation can be approximated based on the downlink received BER. It also sends a power setting signal to the adaptive controller 52. The adaptive controller also receives information from the ATM protocol stack program 50 and controls the encoding rate (heavy or light) for the terminal. As it monitors the uplink power setting of the terminal and determines that further power increases to overcome rain fades can not be accommodated, it generates a request to the NCC for a move to a heavy encoded channel. When the response is received from the NCC, the processor switches the terminal to the appropriate channel. This process is the equivalent of a coarse uplink transmission power setting. The Adaptive controller processor 52 also inserts Self Addressed Stamped Envelop (SASE) cell blocks into the uplink stream and instructs the uplink power control function to adjust the uplink power up or down incrementally (by either a step or ramp function). The processor then looks for return SASEs in the downlink data stream. Through a closed loop process of adjusting the uplink power of these cells, the processor can determine the minimum uplink power needed for correct decoding on the satellite. The processor also instructs the uplink power control function to adjust the uplink power up or down in steps for uplink probes independent of the data symbol blocks. Again, the processor can determine the minimum uplink power needed for correct probe decoding on the satellite. Note that the power requirements for uplinked data packets can be correllated to the power requirements for uplinked timing probes in the absence of interference within the data portion of the channel.

Figure 4A:
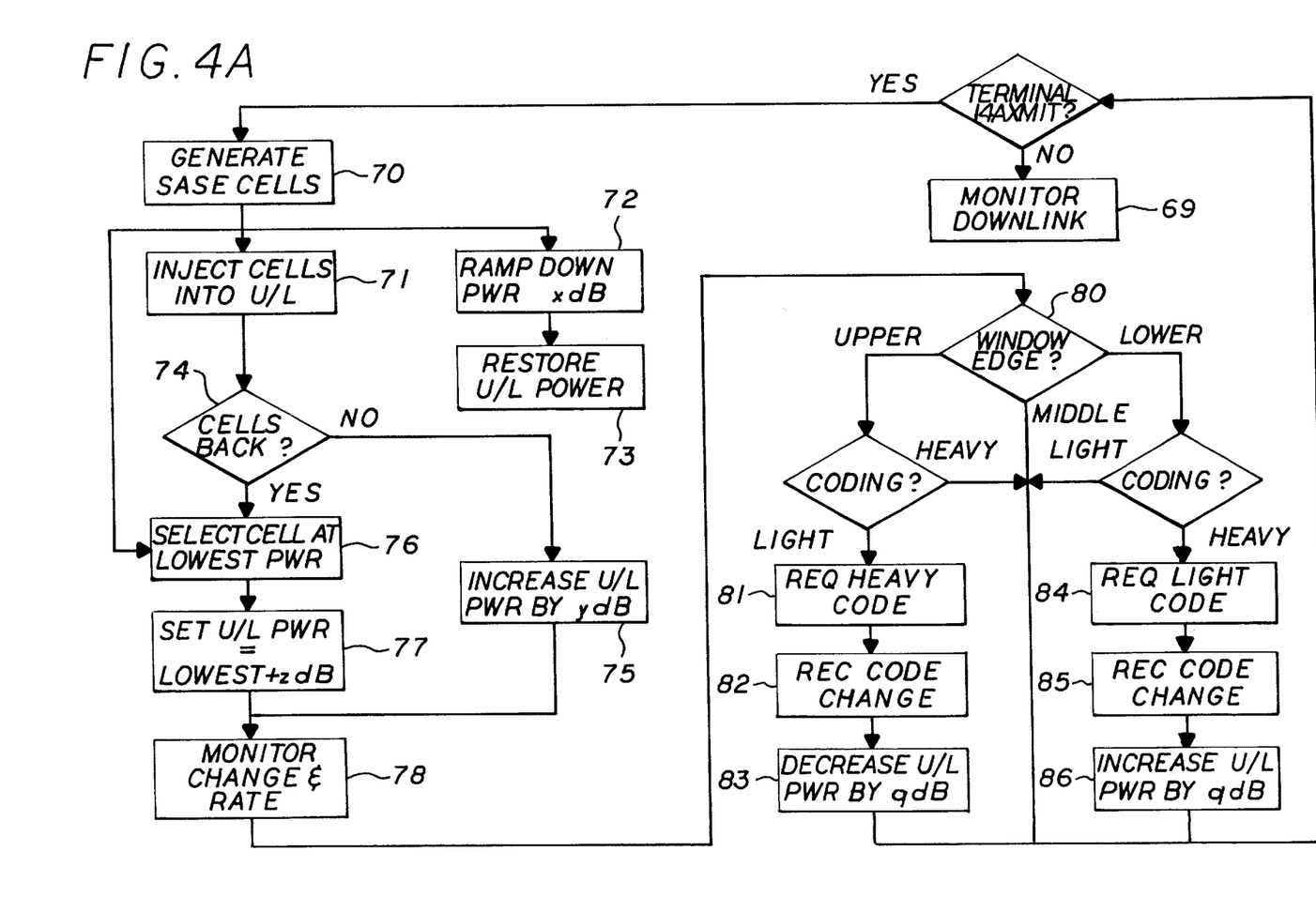
FIG. 4A is a flow chart for a computer program using self addressed data packets for the terminal illustrated in FIG. 3.

Referring to FIG. 4A, precise terminal uplink power control is achieved by the adaptive control subroutine illustrated therein. If the terminal 14A is not transmitting the program monitors downlink, indicated by numeral 69. If the terminal is operating the following steps are undertaken:

Step 70. Generate ATM cells—ATM cells are generated that consist of:
  a. A header containing the terminals own address termed the Self Addressed Stamped Envelope (SASE) addressing.
  b. The value of the current terminal uplink power setting reduced from nominal in steps of x/ndB where n is the number of cells in the uplink coding block.
  c. A Pseudo-random Noise(PN) code used for BER determination.

Step 71 Inject ATM Cells—The ATM cells are injected into the uplink traffic stream as a block of n concatenated ATM cells.

Step 72 Ramp Down Uplink Power—As these cells are uplinked the power amplifiers output is ramped down linerally from nominal to nominal minus xdB.

Step 73 Restore Uplink Power—After the SASE cells are uplinked the terminal restores its uplink power level to nominal to support user traffic.

Step 74 Monitor SASE return cells—The terminal monitors the downlink for the return of the SASE cells.

Step 75 Increase Uplink Power—if none of the block of cells is returned, the uplink power controller 46 is directed to increase its power from nominal by ydB where y is a previously determined empirical number. The process is then repeated. This provides the terminal with a means to determine if any ATM traffic cells are being processed by the satellite and to recover if they are not.

Step 76 Select Returned ATM cells—If any ATM cells are returned the one with the lowest power indication and acceptable BER is selected.

Step 77 Set Uplink Power Level—The subroutine then sets the terminals power amplifier output to a new nominal setting equal to the selected cells uplink power setting plus a small delta to ensure that the uplink power setting is placed near but below the midpoint of the xdB window.

Step 78 Monitor Change And Rate—The change and rate of change of uplink power is monitored to determine how often the SASE cells need to be injected to re-baseline the uplink power. The subroutine is then repeated. Monitoring change allows consumption of fewer resources where the link propagation characteristics are static.

Step 80 Determine if Power Window Edge Approached— The subroutine next checks to see if the power level is approaching either edge of the operating window. If not the subroutine repeats. If the upper (high uplink power) operating window edge is approached, the subroutine checks to determine which encoding level is in use. If heavy encoding is in use the subroutine repeats as no addition link robustness is available (a prompt is sent to the application layer indicating zero link margin). If light encoding is in use it indicates that a more robust ATM cell block encoding scheme needs to be employed. If the lower (low uplink power) operating window edge is approached, the subroutine checks to determine which encoding level is in use. If light encoding is in use the subroutine repeats as no reduction in link robustness is possible. If heavy encoding is in use it indicates that a less robust ATM cell block encoding scheme needs to be employed.

Step 81 Request Heavy Coding—The subroutine prompts for a request to the NCC 18 for a change to a heavy encoding channel and waits for the response.

Step 82 Receive Code Change—A new channel assignment is received from the NCC authorizing a move to a heavy coded channel.

Step 83 Decrease Uplink Power—The terminal tunes to the new channel and reduces its uplink power by the encoding gain plus a small delta to ensure that the uplink power setting is placed near but below the midpoint of the xdB window. The subroutine then repeats.

Step 84 Request Light Coding—The subroutine prompts for a request to the NCC18 for a change to a light encoding channel and waits for the response.

Step 85 Receive Code Change—A new channel assignment is received from the NCC authorizing a move to a light coded channel.

Step 86 Increase Uplink Power—The terminal tunes to the new channel and increases its uplink power by the encoding loss plus a small delta to ensure that the uplink power setting is placed near but below the midpoint of the xdB window. The subroutine then repeats.

Figure 4B:
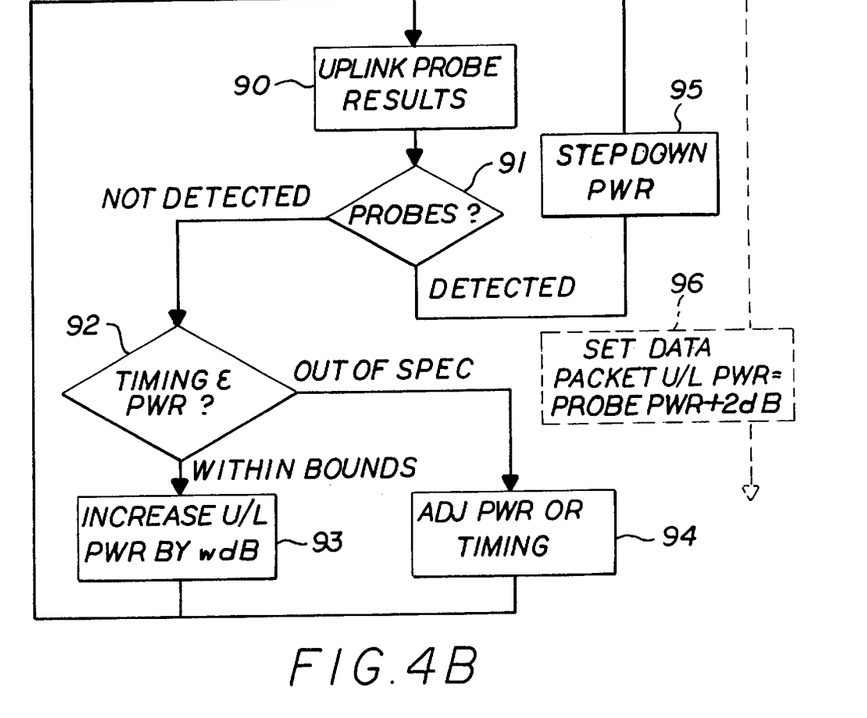
FIG. 4B is a flow chart of a computer program providing open loop uplink probe power control.

Concurrent with the above process the subroutine is also monitoring the results of uplink timing probes to ensure that sufficient power is being utilized for their detection and processing by the satellite. Referring to FIG. 4B the following steps are completed:

Step 90 Monitor uplink probe results

Step 92 Determine If Timing And Power Within Bonds—If the satellite is detecting the uplink probes then it returns a value of "Early or Late" to the terminal.

Step 92 Increase Uplink Power—If timing is within the required window and the power estimate from the downlink is within bounds, the subroutine will increase probing power. If either of these is out of bounds then the terminal will make corrections until probe results are received. Note that in a standby or receive state the terminal may have little ATM cell traffic on the uplink. In addition, a terminal in a receive state may have no uplink traffic resources allocated but must be ready with a correct uplink power setting to support reception of a call (requires terminal to answer).

Step 93 Increase Uplink Power—If probe results are not returned and terminal parameters are normal, the terminal increases its uplink power from nominal by wdB where w is a previously determined empirical number. The probing process is then repeated.

Step 94 Adjust Power or Timing—If the time timing or power are out-of-bounds, the subroutine re-estimates the uplink power requirement from downlink BER and adjusts its timing before uplinking a new probe. This is needed on cold start and to recover when a link restores from a deep fade.

The Uplink timing probes themselves can be used in a closed loop power measurement process as follows:

Step 95 Step Down Power—When probes are detected, processed and reported by the satellite, the subroutine decreases the terminal uplink power in steps until probes are no longer detected and the process is repeated.

The use of these two mechanisms in tandem along with downlink power estimation is recommended. Used simultaneously they can detect other interfering terminals or systems by noting the differences between power control changes determined by each mechanism and the associated rate of change. For example, probing interference caused by other terminals grossly mistimed can be detected and reported to the NCC 18 for resolution. Of course, the timing probes can be used to adjust the uplink power of the data packets. Because the timing probe power requirements correlate to those of the data packets, even through they are transmitted at different frequencies. An addition of a Step 96 In the flow chart illustrated in FIG. 4B, as follows is all that is required.

Step 96 Set Data Packet Up Link Power Equal to Probe Power Plus 2dB—(shown in dotted lines)

Figure 5:
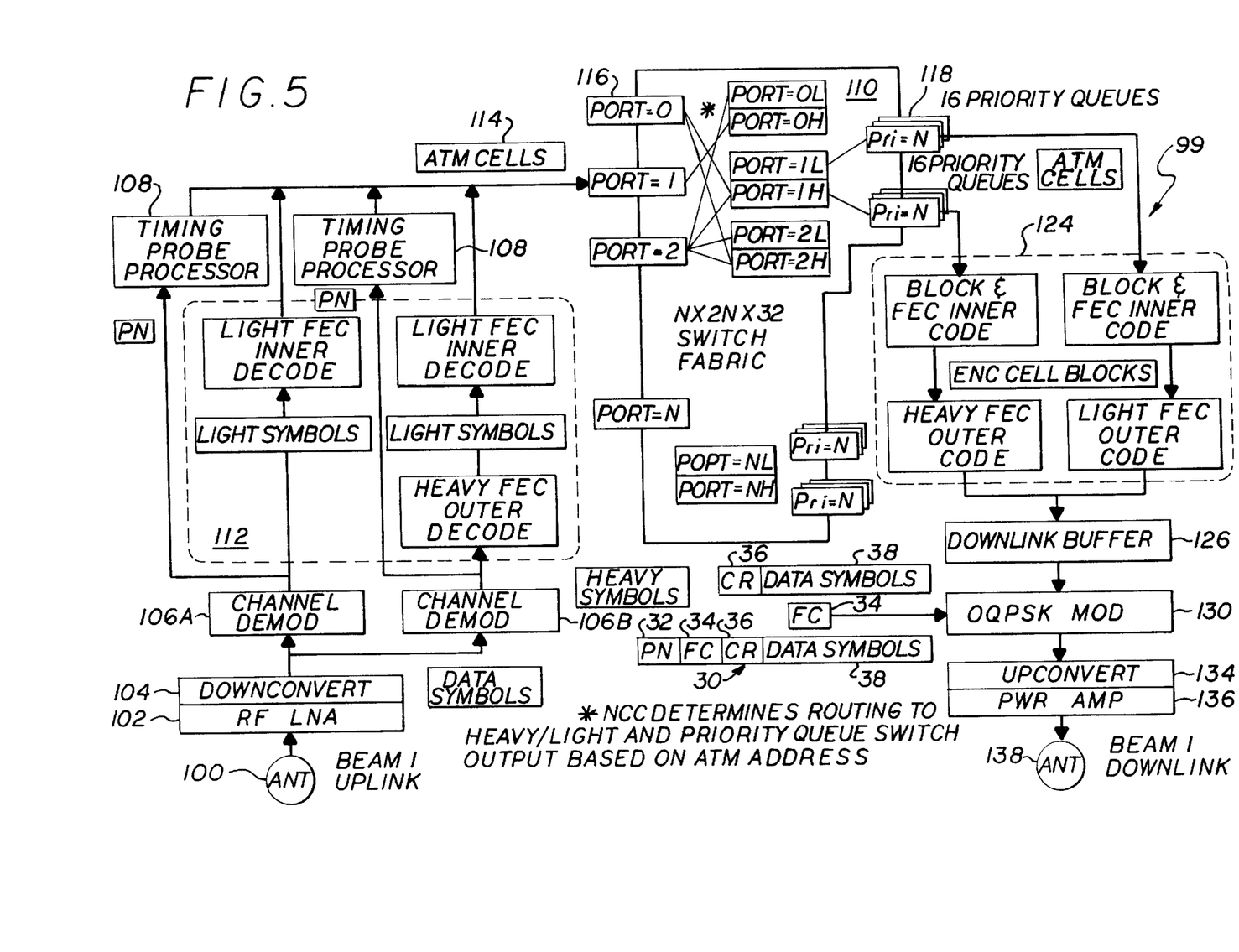
FIG. 5 is a generalized schematic of a satellite switching system.

Referring to FIG. 5, Payload, generally designated by numeral 99 of the satellite 16 operates in the following manner. An uplink antenna 100 sends the incoming signal to a Low Noise Amplifier 102 and then to a downconverter 104. The NCC 18, in a manner to be subsequently discussed, is capable of pre-configuring these payload demodulators 106A and B to process a channel as having either heavy or light encoded symbols by uplinking a payload command message. The timing probe processor 108 examines the phasing sequence indication 32 received in each probe slot at the start of the uplink frame. Each terminal on the system is assigned its own probe slot and the payload looks for phasing sequence indication 32 energy within each probe slot. The timing probe processor 108 compiles the results for all probe slots within the frame. Each slot is reported in time order as either early, late or no detect (the terminals know where in the probe slot order their own slot is and, hence, no "addressing" information is required). The compiled results are packaged into a sequence of ATM cells having a well-known address (known by the terminal) and routed to the payload switch 110 for downlinking. The timing probe processor 108 is configured to process either heavy or light encoded timing probes and is set at the same time as the channel demodulator 106.

The adaptive decoder 112, operates in a manner similar to adaptive decoder 44 in the terminal 14A taking light or heavy encoded uplink cell blocks in and outputs decoded individual ATM cells 114. for each of k cell blocks on the channel. The payload switch 110 routing is set by the NCC 18 either apriori to support signaling (including probe results routing) and dynamically during call setup to support user traffic. Inbound ATM cells are input on ports 116. The switch 110 routes each individual cell to the appropriate output port 118 where output ports exist in tandem to support either heavy or light downlink encoding 120.

In the adaptive processor 124, the ATM cells are then assembled into cell blocks of sufficient length for the FEC coding to have the needed gain for the downlink. A light outer code is then applied and the encoded cell blocks are passed to the next processing step. If the switch routing maps the uplink ATM cells to heavy downlink encoding a heavy outer FEC code is applied. A heavy encoding indicator is appended to the cell block header for use by the receiving terminal. If the switch routing maps the uplink ATM cells to light downlink encoding a light outer FEC code is applied. A light encoding indicator is appended to the cell block header for use by the receiving terminal. All encoded cell blocks are supplied with the appropriate code rate headding and are assembled in the downlink buffer 126 for scheduling. The downlink appends the frame count (FC) supplied by the uplink to establish frame identity within the uplink frame. This information is provided to the downlink modulator 130. The cell blocks are Offset QPSK modulated. The modulator 130 output frequency is raised in by the downlink upconverter 134,amplified by the power amplifier 136 and sent to the downlink antenna 138 associated with the particular switch port.

Figure 6:
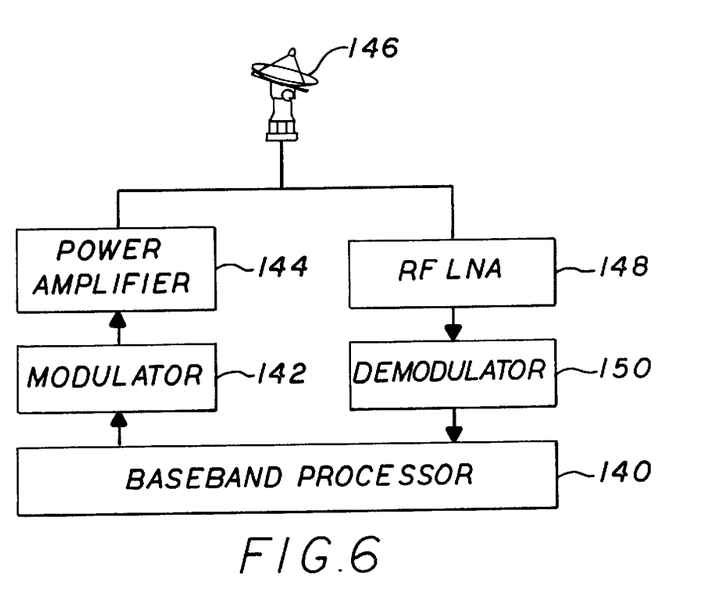
FIG. 6 is a semi schematic of a net work control center.

Referring to FIG. 6, the NCC 18 includes a baseband processor 140 coupled to a modulator 142 and power amplifier 144 that in turn is coupled to an antenna 146. On the downlink side the antenna is coupled to a low noise amplifier 148, to a demodulator 150 and to the baseband processor 140. The NCC 18 includes means to configure the satellite to define which uplink channels and downlink blocks use which coding.

Figure 7:
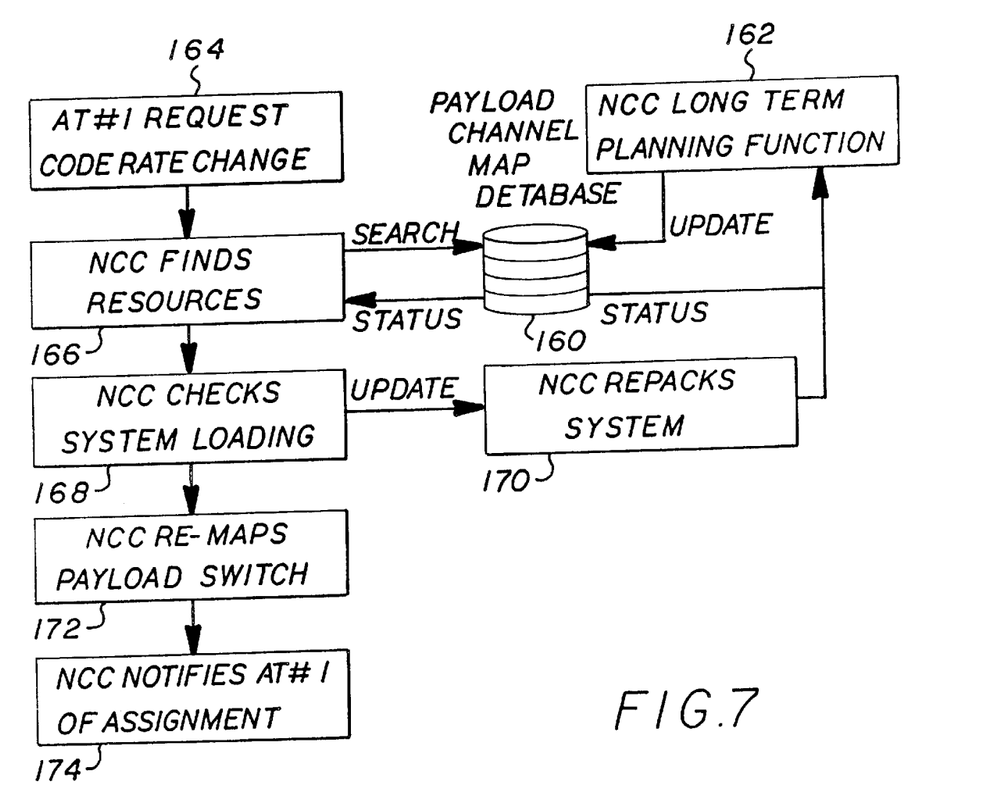
FIG. 7 is a flow chart of a computer program for the network control center that performs decision making calculations for switching selective channels on board the satellite from low to heavy encoding rates.

Referring to FIG. 7, the NCC 18 incorporates a computer program that pre-configured the payload demodulators X in the satellite 16 using a payload channel map data base 160 with available heavy channels as part of its long term planning process file based on regional historical rain profile data base 162.

Step 164 Terminal Request—The NCC 18 receives a terminal request from a terminal 14A–D Step 166 NCC 18 FindsResources—The NCC 18 searches its database 160 availability to find the heavy channel resources (based on the NCC's 18 knowledge of the terminals current light channel allocations).

Step 168 Check System Loading—Part of this search includes ensuring the new resources fit within the system traffic management parameters payload downlink buffer loading (heavy channels use twice the downlink resources due to the associated rate 1/2 encoding).

Step 170 Determination If Repacking Is Necessary—At this point the NCC 18 determines if repacking some of the system's channel resources is required.

Step 172 NCC Re-maps Payload Switch—The NCC 18 moves heavy, and possibly light, terminals to new channel assignments to fit the new request (note that a rain fade most likely affects numerous terminals and the NCC must therefore plan to accommodate multiple requests).

Step 174 NCC Notifies Terminal Assignment—The NCC 18 then sends the terminal 14A a message indicating the new channel assignment to support the code rate requested.

Having described the complete system, following is a summary of the steps used when a terminal changes from light coding to heavy or more robust coating. Particularly referring to FIGS. 1–7 and additionally to FIG. 8, the terminal 14A is assumed in communication with the terminal 14B in clear air and in light code. When the terminal 14A experiences a rain fade and, after adjusting its uplink power to compensate, approaches its maximum uplink power (the rate of fade affects the time at which the terminal requests a channel change, the faster the fade the sooner the request). At this point terminal 14A must soon go to heavy code in order to maintain link closure. It formulates and uplinks a message addressed to the NCC 18 (using a well known address) requesting assignment to a heavy code channel. The satellite 16 relays this message to the NCC 18 without modification. At this point Terminals 14A and 14B continue to pass traffic that is light encoded on their uplinks and downlinks.

Figure 8:
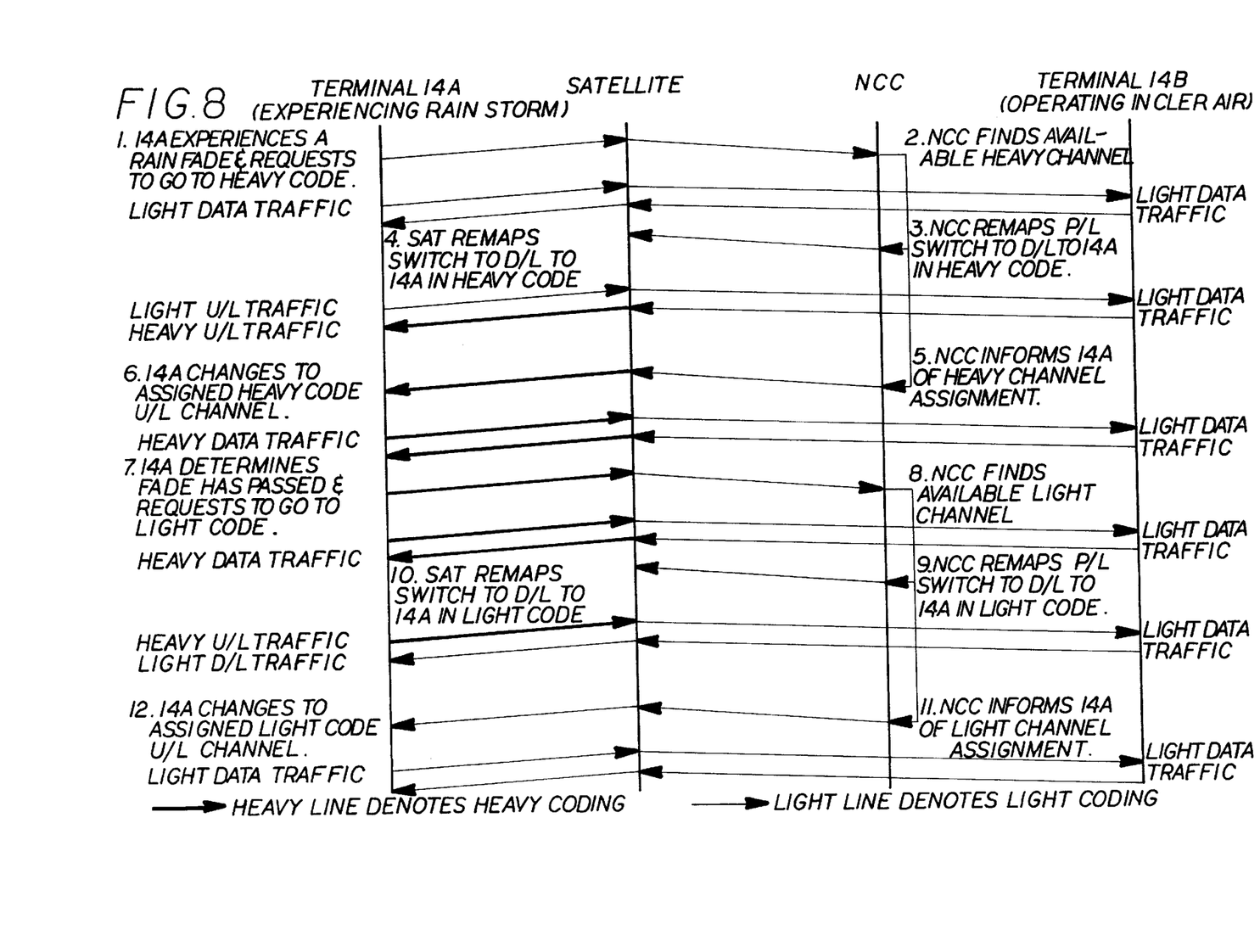
FIG. 8 is a flow chart of the overall process for controlling transmission quality of the terminal.

As previously mentioned, the NCC 18 has pre-configured the payload demodulators 106A–B with available heavy channels as part of its long term planning process based on regional historical rain profile data. 160 payload channel usage and availability to find the heavy channel resources (based on the NCC's 18 knowledge of terminal 14A's current light channel allocations). Part of this search includes ensuring the new resources fit within the system traffic management parameters for payload downlink buffer loading (heavy channels use twice the downlink resources due to the associated rate 1/2 encoding). At this point the NCC 18 may have to repack some of the system's channel resources. It does this by moving heavy, and possibly light, terminals to new channel assignments to fit the new request (note that a rain fade most likely affects numerous terminals and the NCC 18 must therefore plan to accommodate multiple requests). Assuming the request can be granted, the NCC 18 commands the payload 99 to re-map the switch 110 to route all terminal 14A's connections through the switch port's (associated with the downlink beam) heavy encoded downlink buffer. The payload re-maps the switch 110 as commanded. All traffic from terminal 14A to terminal 14B now is heavy encoded on the downlink to terminal 14A. The traffic from terminal 14A to terminal 14B is still light encoded on terminal 14A's uplink. The NCC 18 sends a message to terminal 14A informing it of the new channel/slot assignment to support heavy encoding on the uplink. Terminal 14A changes to its new channel/slot assignment and uplinks traffic that is heavy encoded (and backs-off its power to compensate for the encoding gain).

At this point, terminal 14A determines that the rain fade has passed and it formulates and uplinks a message addressed to the NCC18 (using a well known address) requesting assignment to a light code channel. The payload 99 relays this message to the NCC 18 without modification. Terminal 14A and 14B continue to pass traffic that is heavy encoded on terminal 14A uplink and downlink (terminal 14B in clear air continues its use of light coding). As previously mentioned the NCC 18 has pre-configured the payload demodulators 106A–C with available light channels as part of its long term planning process based on regional historical rain profile data. The NCC 18 receives terminal 14A's request and searches its database of payload channel usage and availability to find the light channel resources (based on the NCC's knowledge of terminal 14A's current heavy channel allocations). Part of this search includes ensuring the new resources fit within the system traffic management parameters for payload 99 downlink buffer loading. At this point the NCC18 may have to repack some of the system's channel resources. It does this by moving light, and possibly heavy, terminals to new channel assignments to fit the new request (note that a rain fade most likely affects numerous terminals and the NCC 18 must therefore plan to accommodate multiple requests).

Assuming the request can be granted, the NCC 18 commands the payload to re-map the switch 110 to route all terminal 14A's connections through the switch port's (associated with the downlink beam) light encoded downlink buffer. The payload 99 re-maps the switch 110 as commanded. All traffic from terminal 14A to terminal 14B now is light encoded on the downlink to terminal 14A. The traffic from terminal 14A to 14B is still heavy encoded on terminal 14A uplink. The NCC 18 then sends a message to terminal 14A informing it of the new channel/slot assignment to support light encoding on the uplink. Terminal 14A now changes to its new channel/slot assignment and uplinks traffic that is light encoded (and increases its power to compensate for the encoding loss).

Thus it can be seen that by using self addressed stamped cells and or time probe signals, the terminal can adjust its transmission power level very accurately such that it insures a signal is transmitted thereby reaches the satellite at an acceptable bit error rate. This insures that no energy bleeds into an adjacent channel (due to imperfect bandpass shaping) or bleeds into another beam operating at the same frequency (due to frequency reuse and imperfect antenna patterns).

While the invention has been described with reference to Y particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability to satellite communications industry.

What is claimed is:

1. A system for determining the uplink transmission quality of timing probe signals sent from a terminal to a satellite, the system comprising:

the satellite including first means mounted within said satellite to provide an indicator signal to the terminal as to whether a timing probe signal sent from the terminal has been received thereby; and the terminal comprising a transmission power control for transmitting timing probe signals to the satellite at variable power settings;

second means for preparing timing signals for transmission to the satellite by said transmission power control at a specific power setting;

receiver means for receiving said timing probe indicator signal from the satellite;

processor means for determining if said indicator signal has been received; and third means for adjusting the transmission power level of said transmission power control incrementally downward if said signal is received and incrementally upward if said indicator signal is not received.

2. The system as set forth in claim 1 further comprising the terminal comprising:

said transmission power control also for transmitting data packets to the satellite; and said third means also for adjusting the transmission power level at which said data packets are transmitted by said transmission power control incrementally downward if said indicator signal is received and incrementally upward if said indicator signal is not received.

3. The system as set forth in claim 2 comprising:

the satellite adapted to receive uplink data packets transmitted from the terminal at either light or heavy encoding rates upon receipt of a switching signal;

a network controller for providing said switching signal to the satellite; and the terminal including fourth means to request said network controller to switch the satellite to said heavy encoding, if said transmission power control for transmitting data packets to the satellite at variable power settings can not further increase its power output on command from said third means.

4. The system as set forth in claim 3 wherein the terminal including sixth means to request said network controller to switch the satellite to said light encoding if said transmission power control for transmitting data packets to the satellite for at variable power settings can not further decrease its power out on command from said means to adjust the power adjust the transmission power level of said transmission power control.

5. A communication system comprising:

a satellite having first means to receive timing probe signal and to provide an indicator signal indicating that the timing probe signal was not received;

a terminal comprising:

a transmission power control for transmitting timing probe signals to said satellite at variable power settings;

second means for preparing timing signals for transmission to said satellite by said transmission power control at a specific power setting;

receiver means for receiving indicator signal from said satellite;

processor means for determining if said indicator signal has been received; and third means for adjusting the transmission power level of said transmission power control incrementally downward if said indicator signal is received and incrementally upward if said indicator signal is not received.

6. The system as set fourth in claim 5 comprising:

said satellite adapted to receive uplink data packets transmitted from said terminal at either light or heavy encoding rates upon receipt of a switching signal;

a network controller for providing said switching signal to said satellite; and said terminal including fourth means to request said network controller to switch said satellite to said heavy encoding, if said transmission power control for transmitting data packets to said satellite at variable power settings can not further increase its power out on command from said third means.

7. The system as set forth in claim 6 comprising:

said satellite adapted to receive uplink data packets transmitted from said terminal at either light or heavy encoding rates upon receipt of a switching signal;

a network controller for providing said switching signal to said satellite; and said terminal including fifth means to request said network controller to switch the satellite to said heavy encoding, if said transmission power control for transmitting data packets to said satellite for at variable power settings can not further increase its power out on command from said third means.

8. The system as set forth in claim 7 wherein said terminal including sixth means to request said network controller to switch said satellite to said light encoding if said transmission power control for transmitting data packets to said satellite for at variable power settings can not further decrease its power out on command from said third means.

9. A method of adjusting the transmission quality of a timing signal sent from a terminal to a satellite, the method comprising the steps of:

preparing timing probe signals;

periodically transmitting a specific timing probe signal to the satellite with the timing probe signal at a specified power level;

determining whether the satellite has received the specific timing probe at the specific power level;

generating a signal by the satellite and sending the satellite generated signal to the terminal from the satellite indicative of whether the satellite has received the specific timing probe signall; and incrementally increasing the power output of the terminal used to transmit the specific timing probe, if the previously sent specific timing probe is not received, and incrementally deceasing the power level used to transmit the specific timing probe, if the previously sent specific timing probe is received by the satellite.

10. A method of adjusting the transmission quality of data packets sent form a terminal to a satellite, the method comprising the steps of:

preparing timing probe signals;

periodically transmitting a specific timing probe signal to the satellite with the timing probe signal at a specified power level;

determining whether the satellite has received the specific timing probe at the specific power level;

generating a signal by the satellite and sending the satellite generated signal to the terminal from the satellite indicative of whether the satellite has received the specific timing probe;

incrementally increasing the power output of the terminal during transmission of the specific timing probes, if the previously sent the specific timing probe is not received, and incrementally decreasing the power level used to transmit the specific timing probe, if the previously sent specific timing probe is received by the satellite; and incrementally increasing or decreasing the power output of the terminal during the transmittal of data packets in proportion to the incremental increase or decrease, respectively, in the power output of the terminal during transmission of the specific timing probes.

11. The method as set forth in claim 9 wherein the satellite has the capacity to switch transmissions from light to heavy encoding rates at the command of a network control center and when said terminal can not further increase power; the additional steps of:

requesting the network control center to switch the satellite to receive uplink signals transmitted by the terminal from light encoding rates to heavy encoding rates;

switching the satellite from a light encoding rate to heavy encoding rates; and transmitting uplink signals from said terminal to the satellite at heavy encoding rates.

\* \* \* \* \*